United States Patent
Schwarzer

(10) Patent No.: US 11,454,487 B2
(45) Date of Patent: Sep. 27, 2022

(54) SURFACE MEASURING APPARATUS

(71) Applicant: JENOPTIK Industrial Metrology Germany GmbH, Villingen-Schwenningen (DE)

(72) Inventor: Florian Schwarzer, Villingen-Schwenningen (DE)

(73) Assignee: JENOPTIK Industrial Metrology Germany GmbH, Villingen-Schwenningen (DE)

( * ) Notice: Subject to any disclaimer, the term of this patent is extended or adjusted under 35 U.S.C. 154(b) by 345 days.

(21) Appl. No.: 16/856,995

(22) Filed: Apr. 23, 2020

(65) Prior Publication Data

US 2020/0355485 A1 Nov. 12, 2020

(30) Foreign Application Priority Data

May 7, 2019 (DE) ...................... 10 2019 111 797.6

(51) Int. Cl.
*G01B 5/28* (2006.01)
(52) U.S. Cl.
CPC ...................................... *G01B 5/28* (2013.01)
(58) Field of Classification Search
CPC ....................................................... G01B 5/28
(Continued)

(56) References Cited

U.S. PATENT DOCUMENTS 4,503,616 A   3/1985  Pullen ..................... G01B 7/001
                                                    33/558
5,131,166 A   7/1992  Weber ..................... G01B 5/004
                                                    33/1 M (Continued)

FOREIGN PATENT DOCUMENTS

DE   10 2016 115 350 A1   10/2017
DE   10 2017 107 372 A1   10/2018
(Continued)

OTHER PUBLICATIONS

First Office Action of the China National Intellectul Property Administation, in Patent Application 202010352719.7, dated Jul. 30, 2021 (19 pages).

(Continued)

*Primary Examiner* — George B Bennett
(74) *Attorney, Agent, or Firm* — Shlesinger, Arkwright & Garvey LLP

(57) ABSTRACT

Surface measuring apparatus for measuring a surface of a workpiece has a probe for contacting the surface of workpiece, a feed apparatus for moving probe relative to surface of the workpiece along a feed axis for sampling surface of workpiece. The probe outputs a probe output signal during sampling of the workpiece. An evaluation apparatus is in data transmission connection with probe and is designed and programmed to reconstruct the profile of the surface of workpiece based on the probe output signal. Evaluation apparatus is designed and programmed to determine an apparatus frequency signature representing characteristic natural frequencies of the surface measuring apparatus, and an analyzer is provided which detects and analyzes the temporal course of the apparatus frequency signature, such that the functional state of the surface measuring apparatus is assessed based on the temporal course of the apparatus frequency signature.

14 Claims, 3 Drawing Sheets

(58) Field of Classification Search
USPC .......................................................... 702/168
See application file for complete search history.

(56) References Cited

U.S. PATENT DOCUMENTS

| | | | | |
|---|---|---|---|---|
| 6,073,360 | A | 6/2000 | Struble | G01L 35/14 33/783 |
| 7,055,367 | B2 | 6/2006 | Hajdukiewicz | G01B 21/042 33/501.02 |
| 7,284,337 | B2 | 10/2007 | Brenner | G01B 7/012 33/503 |
| 7,434,445 | B2* | 10/2008 | Proksch | G01F 1/28 73/1.79 |
| 7,784,333 | B2* | 8/2010 | Nemoto | G01B 21/04 73/104 |
| 8,006,398 | B2 | 8/2011 | McFarland | G05B 19/401 33/503 |
| 8,334,971 | B2 | 12/2012 | Keller et al. | |
| 8,336,224 | B2 | 12/2012 | Arnold | |
| 8,429,829 | B2 | 4/2013 | Arnold | |
| 8,508,743 | B2 | 8/2013 | Keller et al. | |
| 8,725,446 | B2 | 5/2014 | Wegmann | |
| 8,973,280 | B2 | 3/2015 | Seewig | |
| 9,074,865 | B2* | 7/2015 | Yamauchi | G01B 21/30 |
| 9,261,359 | B2 | 2/2016 | DeCool | |
| 9,360,305 | B2* | 6/2016 | Lessing | G01B 11/2441 |
| 9,393,663 | B2 | 7/2016 | Volk | |
| 9,395,310 | B2 | 7/2016 | Rudolf | |
| 9,417,047 | B2* | 8/2016 | Gowen | G01B 5/20 |
| 9,562,756 | B2 | 2/2017 | Seewig | |
| 9,683,914 | B2 | 6/2017 | Dietz et al. | |
| 9,816,811 | B2 | 11/2017 | Riester | |
| 9,879,969 | B2 | 1/2018 | Volk | |
| 9,933,277 | B2 | 4/2018 | Terauchi | G01D 5/04 |
| 9,983,149 | B2 | 5/2018 | Rudolf | |
| 10,132,622 | B2* | 11/2018 | Ould | G01B 21/04 |
| 10,330,915 | B2 | 6/2019 | Rudolf | |
| 10,401,163 | B2* | 9/2019 | Oota | G01B 21/045 |
| 10,408,597 | B2 | 9/2019 | Volk | |
| 10,480,965 | B2 | 11/2019 | Volk | |
| 2004/0231177 | A1 | 11/2004 | Mies | G01B 5/004 33/503 |
| 2008/0148590 | A1 | 6/2008 | Hayashi | G01B 11/24 33/710 |
| 2011/0173829 | A1 | 7/2011 | Pettersson | G01C 15/02 33/503 |
| 2013/0047452 | A1 | 2/2013 | McMurtry | G01B 5/012 33/503 |
| 2014/0208877 | A1 | 7/2014 | Speck | G01B 21/047 73/866.5 |
| 2015/0153149 | A1 | 6/2015 | Pettersson | G01B 7/008 33/503 |
| 2015/0168121 | A1 | 6/2015 | Tait | G01B 5/008 33/503 |
| 2016/0116276 | A1 | 4/2016 | Featherstone | G01B 5/012 33/503 |
| 2016/0153767 | A1 | 6/2016 | Ihlenfeldt | G01C 3/08 33/503 |
| 2019/0077076 | A1 | 3/2019 | O'Hare | G01B 5/0007 |
| 2019/0242702 | A1* | 8/2019 | Singh | G01B 11/005 |
| 2019/0249975 | A1 | 8/2019 | Steuer | G01B 5/016 |
| 2020/0033110 | A1* | 1/2020 | Shin | G01B 5/202 |
| 2021/0180933 | A1* | 6/2021 | Haas | G01B 21/04 |

FOREIGN PATENT DOCUMENTS

| | | |
|---|---|---|
| DE | 10 2017 107 373 A1 | 10/2018 |
| DE | 10 2017 107 972 A1 | 10/2018 |
| DE | 10 2017 106 741 A1 | 2/2019 |

OTHER PUBLICATIONS

"A Survey of network anomaly detection techniques" Mohiuddin Ahmed et al., Journal of Network and Computer Applications 60(2016) Dec. 11, 2015, pp. 19-31(13 pages).

* cited by examiner

SURFACE MEASURING APPARATUS

CROSS-REFERENCE TO RELATED APPLICATIONS

This application claims the priority of German Application No. 10 2019 111 797.6, filed 7 May 2019, and which is incorporated herein by reference.

FIELD OF THE INVENTION

The invention relates to a surface measuring apparatus for measuring a surface of a workpiece.

BACKGROUND OF THE INVENTION

Such surface measuring apparatuses in the form of profilometers, for example, are generally known, for example from DE 10 2017 107 373 A1, DE 10 2017 372 A1, DE 10 2017 107 972 A1, and DE 10 2017 106 741 A1.

Known surface measuring apparatuses have a probe for contacting the surface of the workpiece, and a feed apparatus for moving the probe relative to the surface of the workpiece along a feed axis for sampling the surface of the workpiece, the probe outputting a probe output signal during the sampling of the workpiece. The known surface measuring apparatuses also have an evaluation apparatus that is in data transmission connection with the probe and is designed and programmed to reconstruct the profile of the surface of the workpiece based on the probe output signal.

OBJECTS AND SUMMARY OF THE INVENTION

An object of the invention is to provide a surface measuring apparatus having improved functional reliability.

This object is achieved by the invention set forth herein.

A basis of the invention is that in the probe output signal, an interference signal that results primarily from temporally variable vibrations of the workpiece and of the probe housing, and from deviations in the guiding of the feed apparatus, is superimposed with a useful signal that originates from a deflection of the probe element of the probe by the surface of the workpiece and that represents the profile to be reconstructed or the shape of the surface of the workpiece to be reconstructed.

Thus, the invention is based on the observation that such mechanical basic disturbances increase when individual components of the surface measuring apparatus are worn or incorrectly adjusted.

A further basis of the invention is that the surface measuring apparatus as a whole represents a vibratory system, and each component of this vibratory system has a characteristic natural frequency. Thus, in the range of basic disturbances, characteristic spectral lines may be associated with individual components of the surface measuring apparatus. The mutual interplay of the components results in an apparatus frequency signature that represents characteristic natural frequencies of the surface measuring apparatus, and that in a manner of speaking forms a "spectral fingerprint" of the surface measuring apparatus.

On this basis, the concept underlying the invention is to monitor the functional state of the surface measuring apparatus by determining changes in the spectral fingerprint over time. Wear or incorrect adjustment of a component of the surface measuring apparatus results in a change over time of the characteristic natural frequency associated with this component, and thus, a change in the apparatus frequency signature, which is detected and analyzed according to the invention.

Accordingly, the invention provides that the evaluation apparatus is designed and programmed to determine an apparatus frequency signature that represents characteristic natural frequencies of the surface measuring apparatus, and that an analysis means (which may be termed an analyzer) or detecting and analyzing the temporal course of the apparatus frequency signature is provided, such that the functional state of the surface measuring apparatus is or may be assessed based on the temporal course of the apparatus frequency signature.

In this way, based on a change over time of the spectral fingerprint of the surface measuring apparatus, functional states due to wear or incorrect adjustment of components of the surface measuring apparatus, in which the necessary measuring accuracy of the surface measuring apparatus is no longer ensured, may be recognized and eliminated by maintenance or adjustment. The functional reliability of a surface measuring apparatus according to the invention is thus increased. In addition, condition-based maintenance is made possible, which saves on time and costs.

In principle, for example vibration sensors may be used for determining the apparatus frequency signature. One extremely advantageous further embodiment of the invention provides that the evaluation apparatus is designed and programmed to determine the apparatus frequency signature based on probe output signals of the probe. This embodiment is based on the finding that the probe of a surface measuring apparatus represents a type of vibration sensor according to the profilometry process. Determining the apparatus frequency signature from probe output signals of the probe has the advantage that additional hardware, for example in the form of external sensors, is not necessary for detecting the apparatus frequency signature. Instead, the hardware that is present in a surface measuring apparatus anyway is used to determine the apparatus frequency signature. The invention may thus be implemented in a surface measuring apparatus in the stated cost-effective manner solely using appropriate software, without additional hardware.

A further embodiment of the above-mentioned embodiment provides that the evaluation apparatus is designed and programmed to determine the apparatus frequency signature in such a way that a signal component that represents the measured surface of a workpiece is separated in order to determine the apparatus frequency signature from a probe output signal that is obtained by measuring a surface of the workpiece. The separation of the signal component, which represents the measured surface of the workpiece, from the probe output signal may take place in any suitable manner, for example by spectral filtering, depending on the particular requirements and circumstances. For determining the spectral fingerprint, the separation may also take place, for example, by measuring a workpiece, for example a flat glass plate, whose surface profile is known. During the measurement of a flat glass plate, the deflection of the probe element of the probe is perpendicular to the surface, i.e., is zero along the z axis, so that the probe output signal that is output during the measurement represents mechanical basic disturbances of the surface measuring apparatus, on the basis of which the apparatus frequency signature is determined. To minimize or at least reduce the influence of short-term changes in the characteristic natural frequencies over time in the determination of the spectral fingerprint, a plurality of successive measurements may be carried out and the result averaged.

One advantageous further embodiment of the invention provides that the functional state of the surface measuring apparatus is classified as "satisfactory" or "unsatisfactory" based on the temporal course of the apparatus frequency signature.

Another extremely advantageous further embodiment of the invention provides that the analysis means is designed and programmed in such a way that the apparatus frequency signature is analyzed utilizing algorithms that are based on the use of an artificial neural network. In this embodiment, the artificial neural network can independently learn during operation, for example based on an anomaly detector, how the spectral fingerprint of the surface measuring apparatus associated with a "satisfactory" functional state appears. In this regard, reference is made, for example, to the literature citation M. Ahmed, A. N. Mahmood, and J. Hu, "A survey of network anomaly detection techniques," Journal of Network and Computer Applications, Vol. 60, pp. 19-31, 2016. A system-specific parameterization of the algorithm is therefore not necessary. For such deviations from the "satisfactory" functional state, the analysis means can automatically recognize an anomaly and the need for maintenance or incorrect adjustment.

Another advantageous further embodiment of the invention provides that the probe is a tactile probe.

According to another advantageous further embodiment of the invention, the surface measuring apparatus is designed as a profilometer.

A method according to the invention for operating a surface measuring apparatus is set forth in claim 8. Advantageous and practical further embodiments of the method according to the invention are set forth in subclaims 9 through 14. This correspondingly results in the same properties and advantages as for the surface measuring apparatus according to the invention and its further embodiments.

The invention is explained in greater detail below with reference to the appended schematic drawings, in which one embodiment of a surface measuring apparatus according to the invention is illustrated. All features that are described, illustrated in the drawings, and claimed in the patent claims, alone or in any combination, constitute the subject matter of the invention, independently of the description or illustration in the drawings.

Relative terms such as left, right, up, and down are for convenience only and are not intended to be limiting.

DETAILED DESCRIPTION OF THE INVENTION

One embodiment of a surface measuring apparatus according to the invention and a method according to the invention for operating a surface measuring apparatus are explained in greater detail below with reference to FIGS. 1 through 3.

Figure 1:
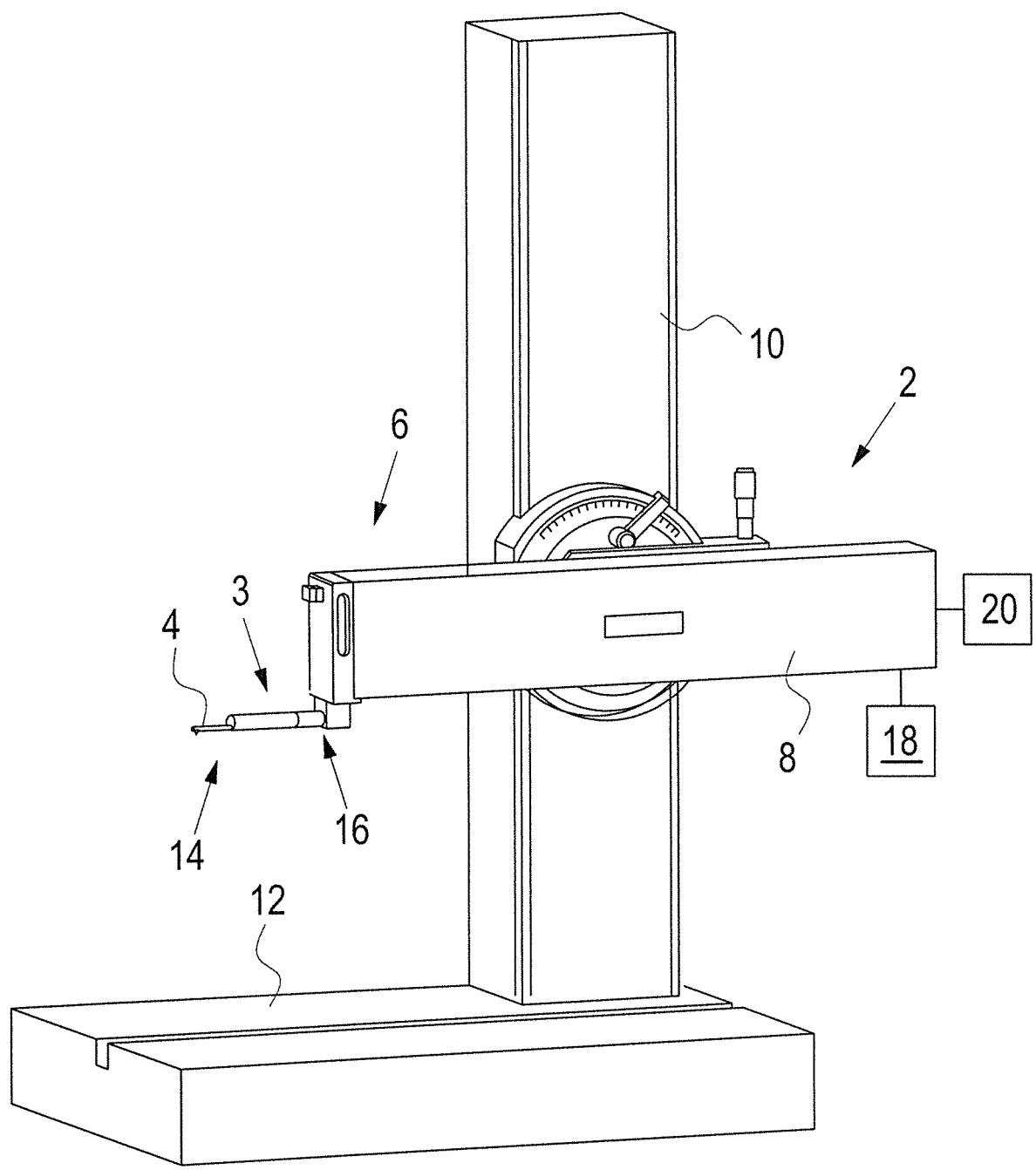
FIG. 1 shows a perspective view of a measuring station according to the invention with an embodiment of a surface measuring apparatus according to the invention in the form of a profilometer.
Figure 2:
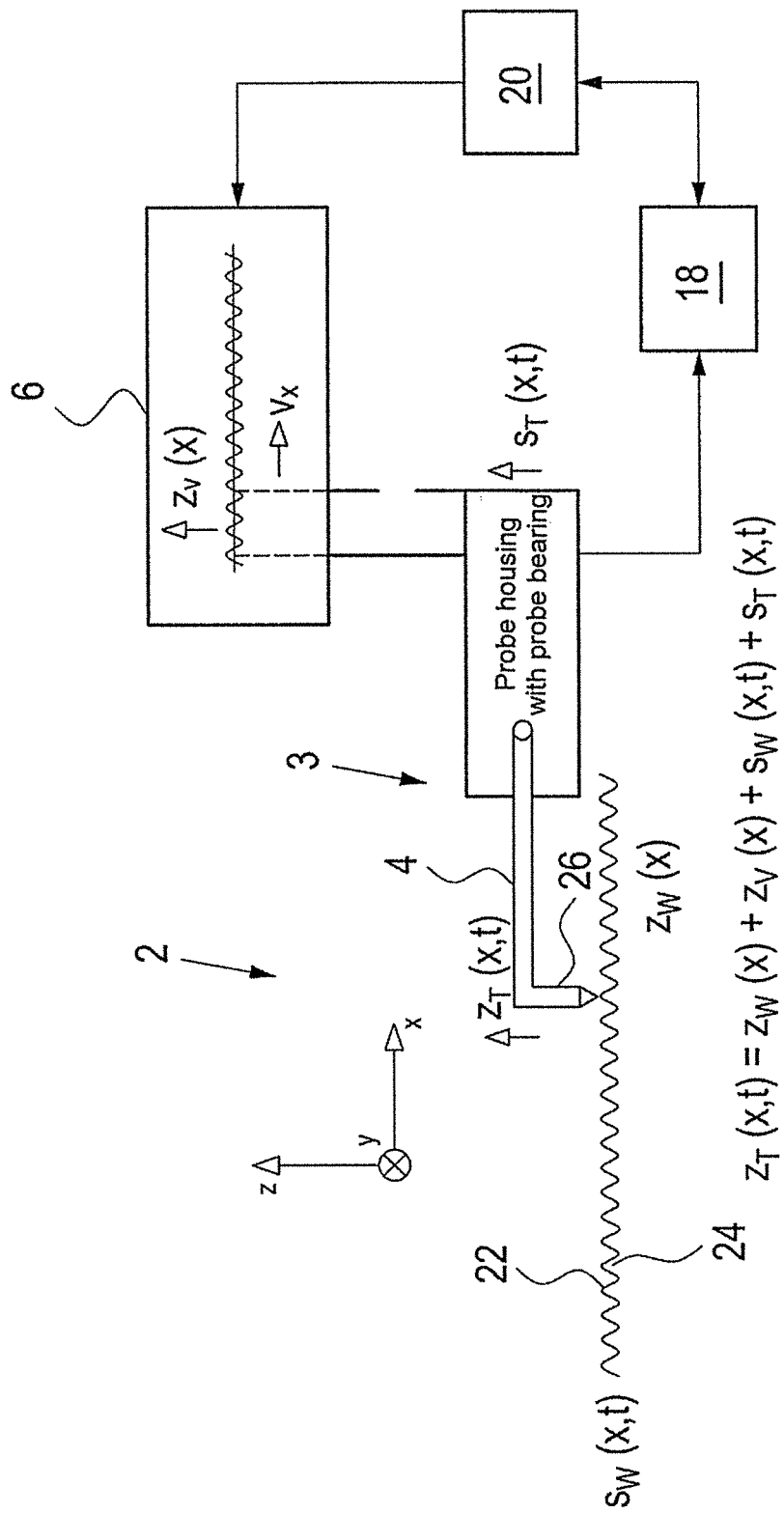
FIG. 2 shows a highly schematic illustration of components of the surface measuring apparatus according to FIG. 1.

FIG. 1 illustrates a measuring station with an embodiment of a surface measuring apparatus 2 according to the invention in the form of a profilometer, having a probe 3 with a probe arm 4 that bears a probe element, not discernible in FIG. 1, for contacting a surface of a workpiece to be measured. The surface measuring apparatus 2 has a feed apparatus 6 whose stationary base body 8 is situated in a height- and inclination-adjustable manner on a measuring column 10, which is mounted on a base plate 12. The probe arm 4 is connected to a movable part 16 of the feed apparatus 6 via a mechanical interface 14.

During operation of the surface measuring apparatus 2, the movable part 16 of the feed apparatus 6 moves relative to the base body 8, so that a workpiece to be measured is sampled by means of the probe element mounted on the probe arm 4. The basic design of such a profilometer, including a probe and a feed apparatus, is generally known and therefore is not explained in greater detail.

The surface measuring apparatus 2 has an evaluation apparatus 18, indicated in FIG. 1 in a purely schematic manner, which is in data transmission connection with the probe and is designed and programmed to reconstruct the profile of the surface of the workpiece based on the probe output signal.

According to the invention, the evaluation apparatus 18 is designed and programmed to determine an apparatus frequency signature that represents characteristic natural frequencies of the surface measuring apparatus, wherein an analysis means 20, likewise indicated in FIG. 1 in a purely schematic manner, is provided for detecting and analyzing the temporal course of the apparatus frequency signature in such a way that the functional state of the surface measuring apparatus 2 is or may be assessed based on the temporal course of the apparatus frequency signature.

In the illustrated embodiment, the evaluation apparatus 18 is designed and programmed to determine the apparatus frequency signature based on probe output signals of the probe 3, wherein the evaluation apparatus 18 is designed and programmed to determine the apparatus frequency signature in such a way that a signal component that represents the measured surface of the workpiece is separated in order to determine the apparatus frequency signature from a probe output signal that is obtained by measuring a surface of a workpiece.

In this embodiment, when carrying out a measurement, a surface 22 (see FIG. 2) of a workpiece 24 is sampled by means of a probe tip 26, the probe tip 26 being deflected in the z direction (zW (x)) corresponding to the profile curve of the surface 22 of the workpiece.

During operation of the surface measuring apparatus 2, in the probe output signal zT (x,t) that is transmitted to the evaluation apparatus 18, an in particular vibration-induced interference signal is superimposed with a useful signal zW (x) that represents the profile of the surface. In the process, temporally variable vibrations of the workpiece 24 result in a deflection sW (x, t) of the probe tip 8. Vibrations of the probe housing result in a deflection sT (x,t). Guide deviations in the feed result in a deflection zV (x).

The profile curve zT (x,t) (probe output signal) measured by means of the probe 3 thus results as follows:

$$zT(x,t) = zW(x) + zV(x) + sW(x,t) + sT(x,t)$$

In this embodiment, the evaluation apparatus 18 is designed as a digital evaluation apparatus that is designed and configured or programmed to evaluate measured values (probe output signal) that are output by the probe 3 during the sampling of the surface 22, wherein in the probe output signal, a vibration-induced interference signal is superimposed with a useful signal that represents the profile of the surface to be measured.

Figure 3:
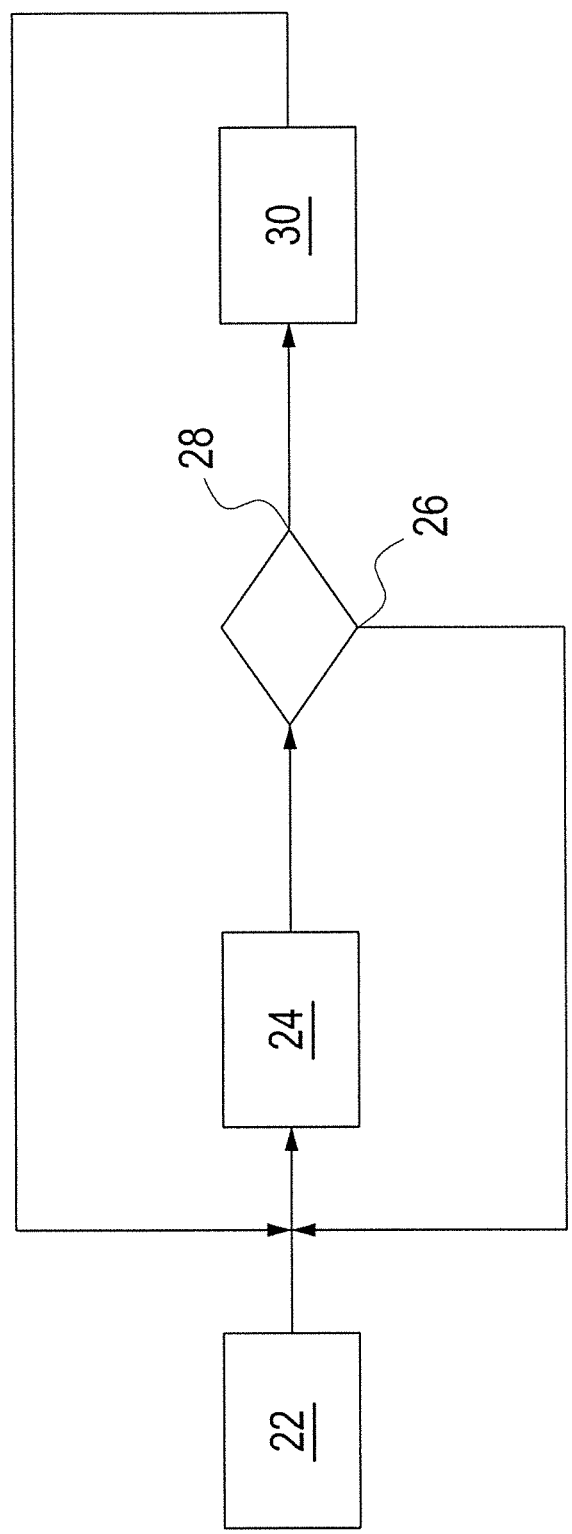
FIG. 3 shows a highly schematic flow chart of one embodiment of a method according to the invention for operating a surface measuring apparatus.

FIG. 3 shows a highly schematic flow chart of one embodiment of a method according to the invention for operating a surface measuring apparatus.

In a first step 28 of the method, an apparatus frequency signature that represents characteristic natural frequencies of the surface measuring apparatus 2, and that in a manner of speaking forms a "spectral fingerprint" of the surface measuring apparatus 2, is determined by the evaluation apparatus 20. The individual spectral components of the apparatus frequency signature represent characteristic natural frequencies of the components of the surface measuring apparatus 2.

In the illustrated embodiment, the apparatus frequency signature is determined by the training apparatuses 18, based on probe output signals of the probe 3. For this purpose, according to the invention the probe 3 is used as a vibration sensor in a manner of speaking.

For determining the apparatus frequency signature, a signal component that represents the measured workpiece surface is separated from a probe output signal that is obtained by measuring a workpiece surface.

According to the invention, for example a flat glass plate may be sampled by means of the surface measuring apparatus 2. Since in this case the deflection of the probe tip 26 is equal to zero, the probe output signal obtained by sampling the flat glass plate represents the apparatus frequency signature. To minimize or at least reduce the influence of short-term changes in the apparatus frequency signature, a multiplicity or plurality of measurements may be carried out and the result averaged to determine the apparatus frequency signature.

If the characteristic spectral lines of the apparatus frequency signature are present in a spectral range that is different from a useful spectrum that represents the profile of the surface to be measured, this useful spectrum may be separated by filtering, using a blocking filter.

After the apparatus frequency signature is determined in step 22, it is stored, and its temporal course during operation of the surface measuring apparatus 2 is detected and analyzed by the analysis means 20 (step 24 in FIG. 3) in such a way that the functional state of the surface measuring apparatus 2 is assessed based on the temporal course of the apparatus frequency signature.

If it is established that the apparatus frequency signature determined in each case corresponds to a functional state of the surface measuring apparatus 2 that is defined as "satisfactory," the measuring operation may be continued (branch 26 in FIG. 3).

On the other hand, if it is established that the apparatus frequency signature has changed and does not correspond to a functional state of the surface measuring apparatus 2 that is defined as "satisfactory" (branch 28), the need for maintenance or adjustment may be indicated, for example, on a display of the surface measuring apparatus 2. After the maintenance or adjustment is carried out, the measuring operation may be continued (see reference numeral 32 in FIG. 3).

In the illustrated embodiment, if the probe of the surface measuring apparatus is used as a vibration sensor in determining the apparatus frequency signature, additional hardware is not necessary for determining the apparatus frequency signature. The method according to the invention may thus be implemented in a surface measuring apparatus using hardware that is present anyway, also by retrofitting.

The invention allows condition-based maintenance of surface measuring apparatuses in a surprisingly simple manner.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention.

The invention claimed is:

1. A surface measuring apparatus for measuring a surface of a workpiece, the surface measuring apparatus comprising:
   a) a probe for contacting the surface of the workpiece;
   b) a feed apparatus for moving the probe relative to the surface of the workpiece along a feed axis for sampling the surface of the workpiece, the probe outputting a probe output signal during the sampling of the workpiece;
   c) an evaluation apparatus in data transmission connection with the probe and programmed to reconstruct the profile of the surface of the workpiece based on the probe output signal;
   d) the evaluation apparatus is designed and programmed to determine an apparatus frequency signature that represents characteristic natural frequencies of the surface measuring apparatus; and
   e) an analysis means for detecting and analyzing a temporal course of the apparatus frequency signature is provided, such that a functional state of the surface measuring apparatus is assessed based on the temporal course of the apparatus frequency signature.

2. The surface measuring apparatus according to claim 1, wherein:
   a) the evaluation apparatus is designed and programmed to determine the apparatus frequency signature based on probe output signals of the probe.

3. The surface measuring apparatus according to claim 1, wherein:
   a) the evaluation apparatus is designed and programmed to determine the apparatus frequency signature in such a way that a signal component that represents the measured surface of the workpiece is separated in order to determine the apparatus frequency signature from a probe output signal that is obtained by measuring the surface of the workpiece.

4. The surface measuring apparatus according to claim 1, wherein:
   a) the functional state of the surface measuring apparatus is classified as "satisfactory" or "unsatisfactory" based on the temporal course of the apparatus frequency signature.

5. The surface measuring apparatus according to claim 1, wherein:
   a) the analysis means is designed and programmed to analyze the apparatus frequency signature utilizing algorithms that are based on the use of an artificial neural network.

6. The surface measuring apparatus according to claim 1, wherein:
  a) the probe is a tactile probe.

7. The surface measuring apparatus according to claim 1, wherein:
  a) the surface measuring apparatus is designed as a profilometer.

8. A method for operating a surface measuring apparatus for measuring a surface of a workpiece, the method comprising:
  a) providing the surface measuring apparatus, the surface measuring apparatus including:
    i) a probe for contacting the surface of the workpiece;
    ii) a feed apparatus for sampling the surface of the workpiece for moving the probe relative to the surface of the workpiece along a feed axis, the probe outputting a probe output signal during the sampling of the workpiece; and
    iii) an evaluation apparatus that is in data transmission connection with the probe and is designed and programmed to reconstruct the surface of the workpiece based on the probe output signal;
  b) the evaluation apparatus determining an apparatus frequency signature that represents characteristic natural frequencies of the surface measuring apparatus; and
  c) the analysis means detecting and analyzing a temporal course of the apparatus frequency signature in such a way that the functional state of the surface measuring apparatus is assessed based on the temporal course of the apparatus frequency signature.

9. The method according to claim 8, wherein:
  a) the evaluation apparatus determines the apparatus frequency signature based on probe output signals of the probe.

10. The method according to claim 8, wherein:
  a) for determining the apparatus frequency signature from a probe output signal that is obtained by measuring a workpiece surface, the evaluation apparatus separates a signal component that represents the measured workpiece surface.

11. The method according to claim 8, wherein:
  a) the functional state of the surface measuring apparatus is classified as "satisfactory" or "unsatisfactory" based on the temporal course of the apparatus frequency signature.

12. The method according to claim 8, wherein:
  a) the analysis means analyzes the apparatus frequency signature utilizing algorithms that are based on the use of an artificial neural network.

13. The method according to claim 8, wherein:
  a) a tactile probe is used as the probe.

14. The method according to claim 8, wherein:
  a) a profilometer is used as the surface measuring apparatus.

* * * * *